US011698166B1

(12) United States Patent
Ryan

(10) Patent No.: US 11,698,166 B1
(45) Date of Patent: Jul. 11, 2023

(54) EMERGENCY ESCAPE DEVICE AND METHOD OF FORMING THE EMERGENCY ESCAPE DEVICE

(71) Applicant: Gregory F. Ryan, Dumont, NJ (US)

(72) Inventor: Gregory F. Ryan, Dumont, NJ (US)

( * ) Notice: Subject to any disclaimer, the term of this patent is extended or adjusted under 35 U.S.C. 154(b) by 0 days.

(21) Appl. No.: 17/852,869

(22) Filed: Jun. 29, 2022

Related U.S. Application Data

(60) Provisional application No. 63/231,778, filed on Aug. 11, 2021.

(51) Int. Cl.
*A62B 35/00* (2006.01)
*F16M 13/02* (2006.01)
*B21D 22/02* (2006.01)
*B21D 35/00* (2006.01)
*A62B 1/00* (2006.01)

(52) U.S. Cl.
CPC ......... *F16M 13/02* (2013.01); *A62B 35/0068* (2013.01); *B21D 22/02* (2013.01); *B21D 35/001* (2013.01); *A62B 1/00* (2013.01)

(58) Field of Classification Search
CPC ............... F16M 13/02; E04G 21/3276; A62B 35/0068; B21D 35/001; B21D 22/02; E06C 9/14
See application file for complete search history.

(56) References Cited

U.S. PATENT DOCUMENTS

| 283,439 A | 8/1883 | Torst |
| 632,692 A | 9/1899 | Boehme |
| 738,785 A | 9/1903 | Epperson |
| 1,169,760 A | 2/1916 | Barrett |
| 1,704,361 A | 3/1929 | Johnsen |
| 2,946,398 A | 7/1960 | McNulty |
| 2,990,908 A | 7/1961 | Wozniak |
| 4,127,184 A | 11/1978 | Strohmeyer |
| 4,249,713 A * | 2/1981 | Glynn ..................... A62B 35/04 248/237 |
| 4,557,442 A | 12/1985 | Krezak et al. |
| 4,683,981 A * | 8/1987 | Salvarezza .............. E06C 7/081 182/199 |
| 4,778,030 A | 10/1988 | Blair |
| 4,811,817 A | 3/1989 | Geary |
| 5,320,193 A * | 6/1994 | Bongiovanni ...... E04G 21/3276 248/237 |
| 5,346,036 A | 9/1994 | Arisman et al. |
| 5,361,558 A * | 11/1994 | Thornton ................ E04D 13/12 52/27 |

(Continued)

*Primary Examiner* — Bradley Duckworth
(74) *Attorney, Agent, or Firm* — Richard M. Goldberg

(57) ABSTRACT

An emergency escape device to which an escape rope is adapted to be secured, includes a unitary, one-piece steel anchor plate; a semi-spherical projection pressed outwardly of the center of the plate, to form an outward projection; portions of the outward projection cut out to form a central opening in the plate, while leaving an arcuate, outwardly extending securement band as a remnant of the outward projection to enable attachment of a carabiner; a peripheral opening cut out to one side of the central opening for receiving at least one bolt for securing the device to a wall; and at least one peripheral opening cut out at to an opposite side of the central opening for receiving at least one bolt member for securing the device to a wall; and the plate being heat treated to impart greater strength thereto.

18 Claims, 14 Drawing Sheets

(56) References Cited

U.S. PATENT DOCUMENTS

| | | | |
|---|---|---|---|
| 5,636,704 A * | 6/1997 | Castaneda | E04G 21/3295 182/5 |
| 5,758,742 A | 6/1998 | Chiou et al. | |
| 5,829,203 A * | 11/1998 | Ealer, Sr. | E04G 21/3261 248/237 |
| 6,098,746 A * | 8/2000 | Castaneda | E04G 21/3214 182/45 |
| 6,786,020 B2 | 9/2004 | Poldmaa | |
| 7,163,083 B2 | 1/2007 | Argoud | |
| 7,854,421 B2 * | 12/2010 | Florent | F16L 3/243 248/300 |
| 8,870,135 B2 * | 10/2014 | Grubbs | F16L 3/14 248/200 |
| 9,145,594 B2 * | 9/2015 | Toji | C22C 38/06 |
| 9,968,977 B2 * | 5/2018 | Marks | C21D 9/46 |
| 10,718,125 B2 * | 7/2020 | Lopez | E04G 21/3214 |
| 11,470,837 B2 * | 10/2022 | Schallenkamp | A01M 23/245 |
| 2004/0035993 A1 | 2/2004 | Curtin | |
| 2006/0059844 A1 * | 3/2006 | Ely | E04G 21/3276 52/698 |
| 2007/0144830 A1 | 6/2007 | Mastenbroek | |
| 2012/0067667 A1 * | 3/2012 | Marcoux | E04G 21/3276 248/237 |
| 2013/0087669 A1 * | 4/2013 | Daddio | E04G 21/3276 248/237 |
| 2014/0182218 A1 * | 7/2014 | O'Donnell | E04D 13/12 52/57 |
| 2017/0361135 A1 * | 12/2017 | Crookston | A62B 35/0068 |
| 2020/0188710 A1 * | 6/2020 | Roseveare, Jr. | E04G 21/3276 |

* cited by examiner

EMERGENCY ESCAPE DEVICE AND METHOD OF FORMING THE EMERGENCY ESCAPE DEVICE

BACKGROUND OF THE INVENTION

The present invention relates generally to enabling an emergency escape from a building and pertains, more specifically, to a standby device dimensioned and configured for unobtrusive location and securement adjacent a portal in a building wall to make available a quick and easy exit through the portal in the event of an emergency, such as an uncontrolled fire.

It has long been recognized that buildings of all kinds must be provided with escape routes and mechanisms which enable a person to make a quick exit and escape in the event of an emergency, such as an uncontrolled fire in the building. In particular, firefighters and/or persons located at the premises very often are faced with an acute situation which requires an immediate response in order to escape injury, or even death, by quickly leaving a building in which there is a fire. A very wide variety of fire escape constructions have been suggested and made available to address such an emergency. However, these constructions usually are quite elaborate, bulky and costly, and are limited to a relatively few, specific locations in a building.

More importantly, such prior constructions are subject to failure during use, because the structural integrity thereof is not sufficient to adequately support one or more persons exiting a building utilizing such constructions.

OBJECTS AND SUMMARY OF THE INVENTION

Accordingly, it is an object of the present invention to provide an emergency escape device and method that overcomes the aforementioned problems.

It is another object of the present invention to provide an emergency escape device and method that is manufactured in a one-piece construction.

It is still another object of the present invention to provide an emergency escape device and method utilizing a one-piece metal plate in which the structural integrity of the metal plate is not compromised.

It is yet another object of the present invention to provide an emergency escape device and method which can be incorporated easily into a building structure at multiple easily accessible locations so as to make available a quick and safe escape from almost any location in the building.

It is a further object of the present invention to provide an emergency escape device and method which provides a simplified, unobtrusive device for ready installation at a multitude of locations throughout an existing building, as well as throughout a newly-constructed building, to enable a quick escape from any such location in the event of an emergency.

It is a still further object of the present invention to provide an emergency escape device and method which enables a ready and easily executed operation for an emergency escape through an existing portal, such as a window or a door, in the wall of a building.

It is a yet further object of the present invention to provide an emergency escape device and method which provides a relatively inexpensive emergency escape device which is always readily available for quick access and use, yet is entirely unobtrusive when not in use.

It is another object of the present invention to provide an emergency escape device and method which enables the convenient placement of an emergency escape mechanism without disrupting the aesthetic appearance of the vicinity in which the mechanism is installed.

It is still another object of the present invention to provide an emergency escape device and method which permits ready and inexpensive installation of an emergency escape device in both existing buildings and new construction.

It is a further object of the present invention to provide an emergency escape device and method to provide a rugged mechanism for reliable service over an extended service life.

It is a still further object of the present invention to provide an emergency escape device and method that is heat-treated to impart greater strength.

It is a yet further object of the present invention to provide an emergency escape device and method which will withstand a pull test of approximately 2,300 to 6,000 pounds.

It is another object of the present invention to provide an emergency escape device and method including a cold steel plate secured to double studs of a window.

In accordance with an aspect of the present invention, a method of forming an emergency escape device to which an escape rope is adapted to be secured, includes the steps of forming a unitary, one-piece steel anchor plate; applying a press substantially centrally of the plate in order to form an outward projection; and a first step of cutting out portions of the outward projection to form a central opening in the plate, while leaving an outwardly extending securement band as a remnant of the outward projection to enable attachment of a carabiner. There is a second step of cutting at least one peripheral opening at one end of the plate to one side of the central opening for receiving at least one securing member for securing the device to a wall; and a third step of cutting at least one peripheral opening at one end of the plate to an opposite side of the central opening for receiving at least one securing member for securing the device to a wall. Thereafter, the plate is heat treated to impart greater strength thereto.

Preferably, the plate has a rectangular shape, and is at least ⅛ inch thick.

Also, the central opening has a circular shape, the outward projection has a semi-spherical shape, and the securement band has an outwardly bowed shape.

In addition, there is a further step of cutting out a portion of the plate to an outside of the central opening to form at least recess opening which is in open communication with the central opening, to enable easier access of the carabiner.

Further, the first step of cutting cuts out the portions of the outward projection to form the outwardly extending securement band which increases in width at opposite ends thereof where the securement band is attached to the plate.

The second and third steps of cutting each cut out the at least one peripheral opening in the form of an elongated slot or a plurality of spaced apart openings.

At least one removable cover plate is formed for the one-piece steel anchor plate when not in use as an emergency escape device.

In accordance with another aspect of the present invention, an emergency escape device to which an escape rope is adapted to be secured, includes a unitary, one-piece steel anchor plate; a semi-spherical projection pressed outwardly of the plate, substantially centrally of the plate, in order to form an outward projection; and portions of the outward projection cut out to form a central opening in the plate, while leaving an outwardly extending securement band as a remnant of the outward projection to enable attachment of a carabiner. There is at least one peripheral opening cut out at one end of the plate to one side of the central opening for receiving at least one securing member for securing the device to a wall; and at least one peripheral opening cut out at one end of the plate to an opposite side of the central opening for receiving at least one securing member for securing the device to a wall. The plate is also heat treated to impart greater strength thereto.

The plate has a rectangular shape, and is at least ⅛ inch thick.

The central opening has a circular shape and the securement band has an outwardly bowed shape.

At least recess opening is cut out from a portion of the plate to an outside of the central opening and being in open communication with the central opening, to enable easier access of the carabiner.

The outwardly extending securement band increases in width at opposite ends thereof where the securement band is attached to the plate.

Each peripheral opening is in the form of an elongated slot or a plurality of spaced apart openings.

Lastly, there is at least one removable cover plate for the one-piece steel anchor plate when not in use as an emergency escape device.

The above and other objects, features and advantages of the invention will become readily apparent from the following detailed description thereof which is to be read in connection with the accompanying drawings.

DETAILED DESCRIPTION

Figure 1:
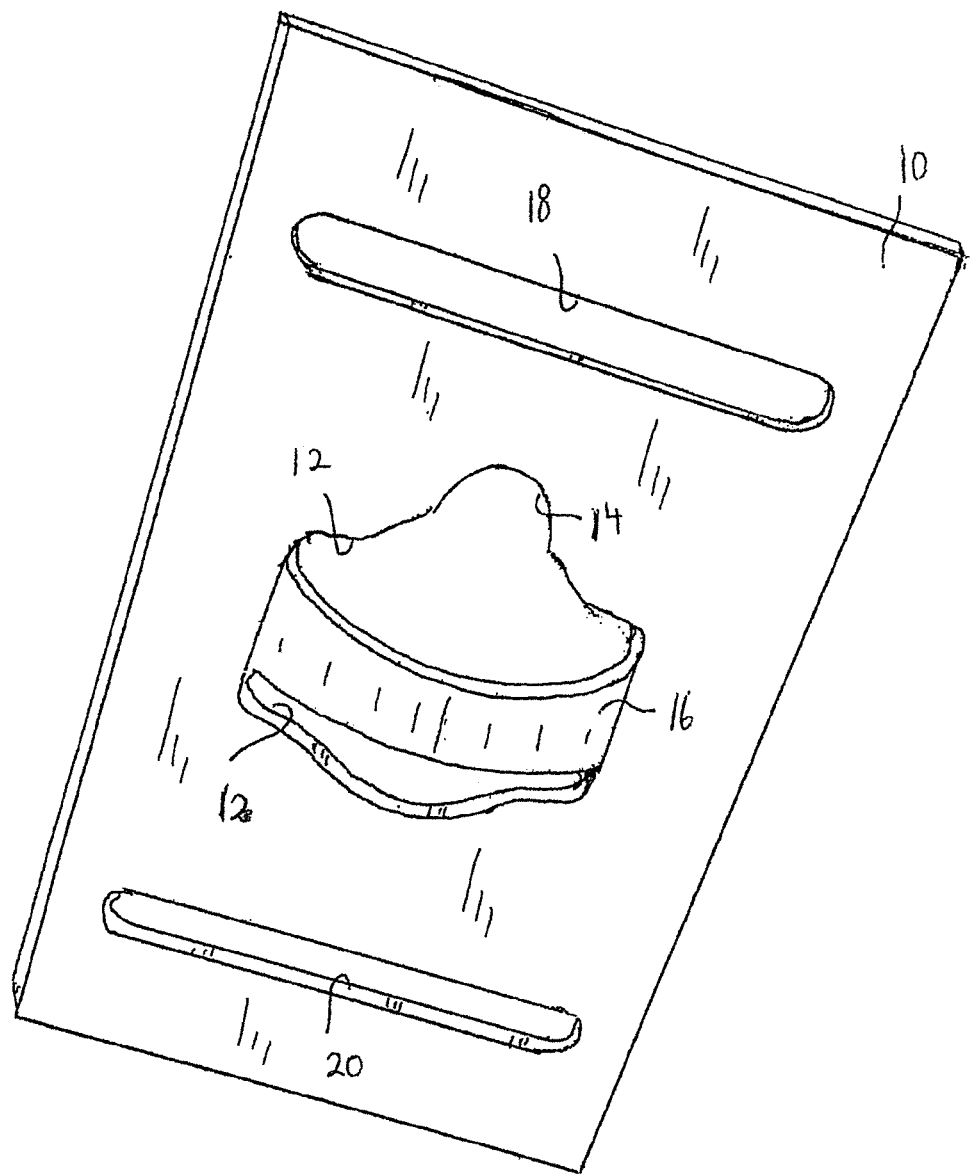
FIG. 1 is a front perspective view of the one-piece steel anchor plate of emergency escape device the present invention.
Figure 2:
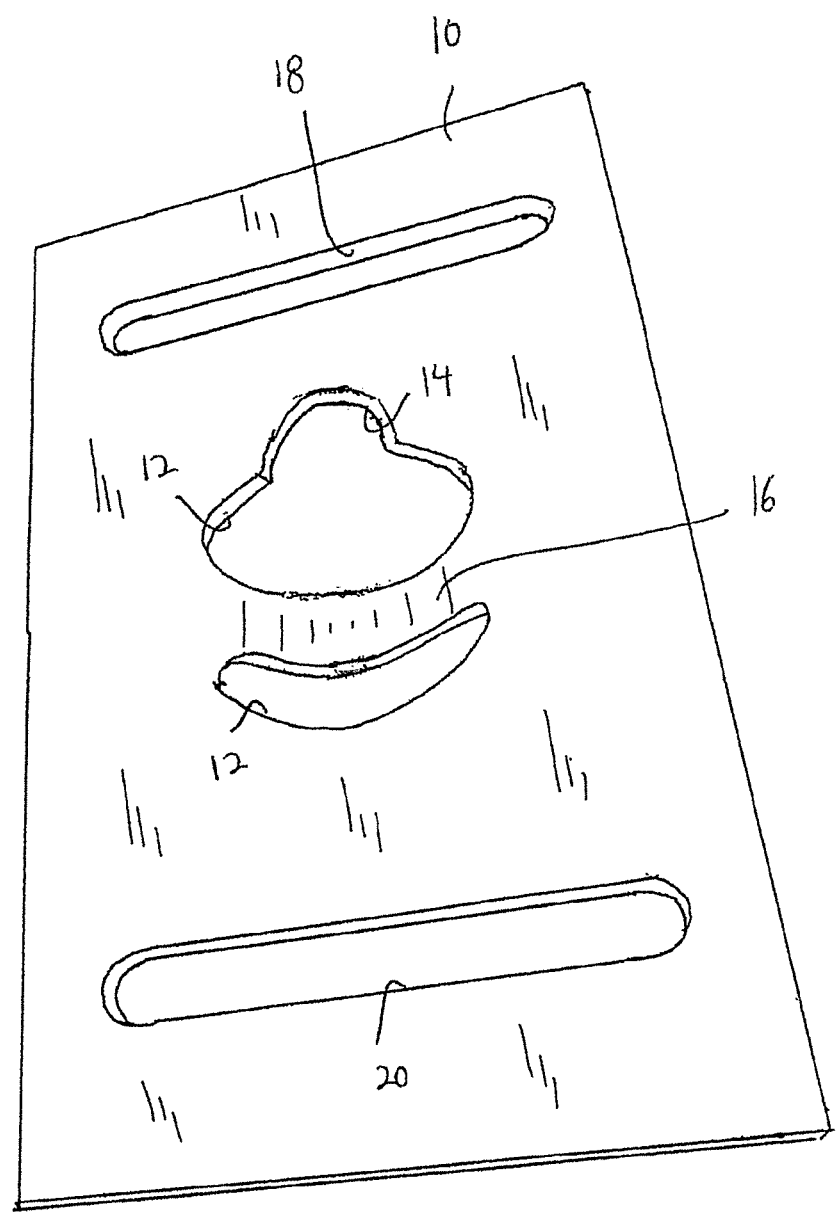
FIG. 2 is a rear perspective view of the one-piece steel anchor plate.
Figure 3:
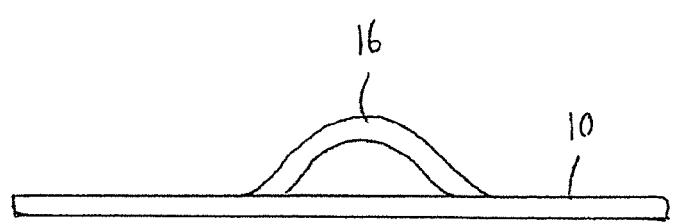
FIG. 3 is a top plan view of the one-piece steel anchor plate.
Figure 4:
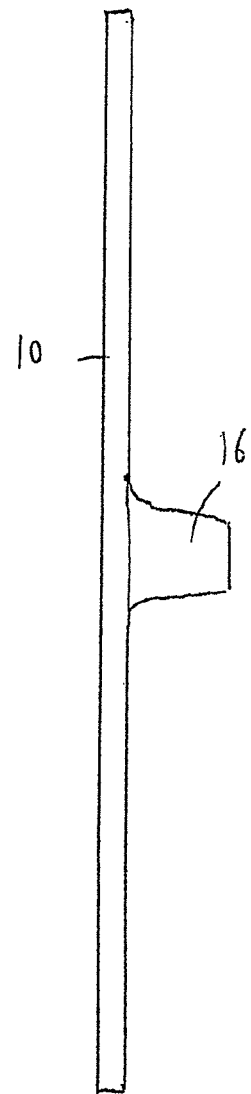
FIG. 4 is a side elevational view of the one-piece steel anchor plate.

Referring to the drawings, and initially to FIGS. 1-5, the emergency escape device according to the present invention includes a unitary, one-piece steel anchor plate 10, preferably of a rectangular shape, although the present invention is not limited thereby. One-piece steel anchor plate 10 is preferably constructed of ⅛ inch thick cold steel.

A central portion of anchor plate 10 includes a central opening 12 of a generally circular shape, with an upper recessed opening 14 in open communication with central opening 12. Alternatively, a mirror image lower recessed opening 14 can be provided as well. An outwardly bowed, arcuate securement band 16 extends in a transverse direction and is connected to opposite ends of anchor plate 10 at opening 12.

Specifically, in order to form this arrangement, a 5000 ton press is applied centrally of a plate having no openings therein in order to form a semi-spherical outward projection. Then, portions of the semispherical outward projection are laser cut out to form central opening 12, leaving only arcuate securement band 16 as the remnant of the semispherical outward projection. Recessed opening 14 is also laser cut out at the same time.

As shown, arcuate securement band 16 preferably increases in width at its attachment to plate 10 to increase the structural integrity, although the present invention is not limited thereby.

As a result, it will be appreciated that arcuate securement band 16 is formed as a one-piece unitary structure with anchor plate 10, without compromising the structure of the metal anchor plate. In other words, arcuate securement band 16 is not welded or otherwise separately attached to plate 10.

In addition, an upper elongated transverse slot 18 is cut out from anchor plate 10 and a lower elongated transverse slot 20 is cut out from anchor plate 10. Slots 18 and 20 can be cut out by any suitable means such as laser cutting, die stamping or the like. Alternatively, in place of slots 18 and 20, four openings can be provided for receiving anchor bolts, in the manner described hereafter.

Thereafter, anchor plate 10 is heat treated to impart greater strength thereto.

Figure 9:
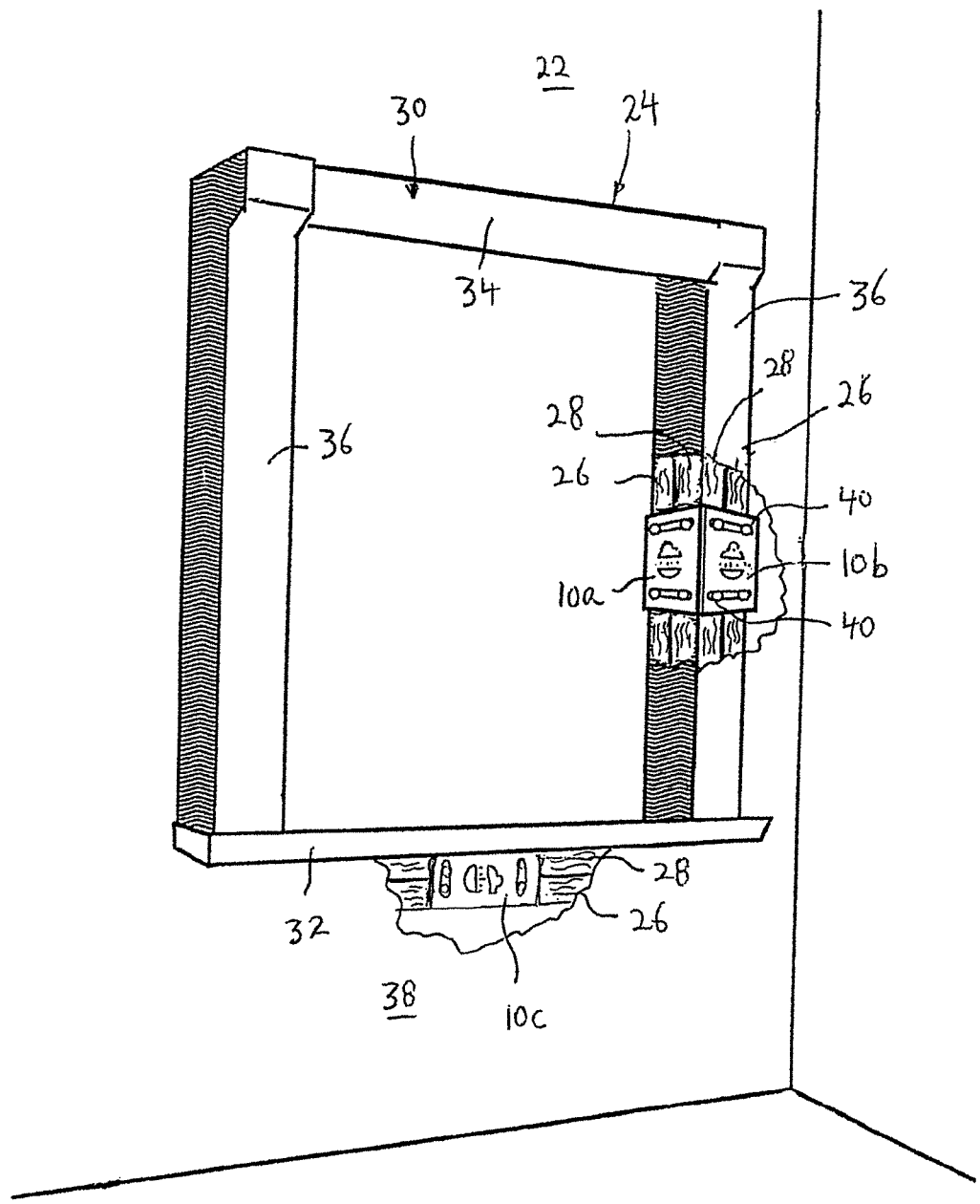
FIG. 9 is a perspective view of a window frame showing various positions in which the one-piece steel anchor plate can be secured.
Figure 10:
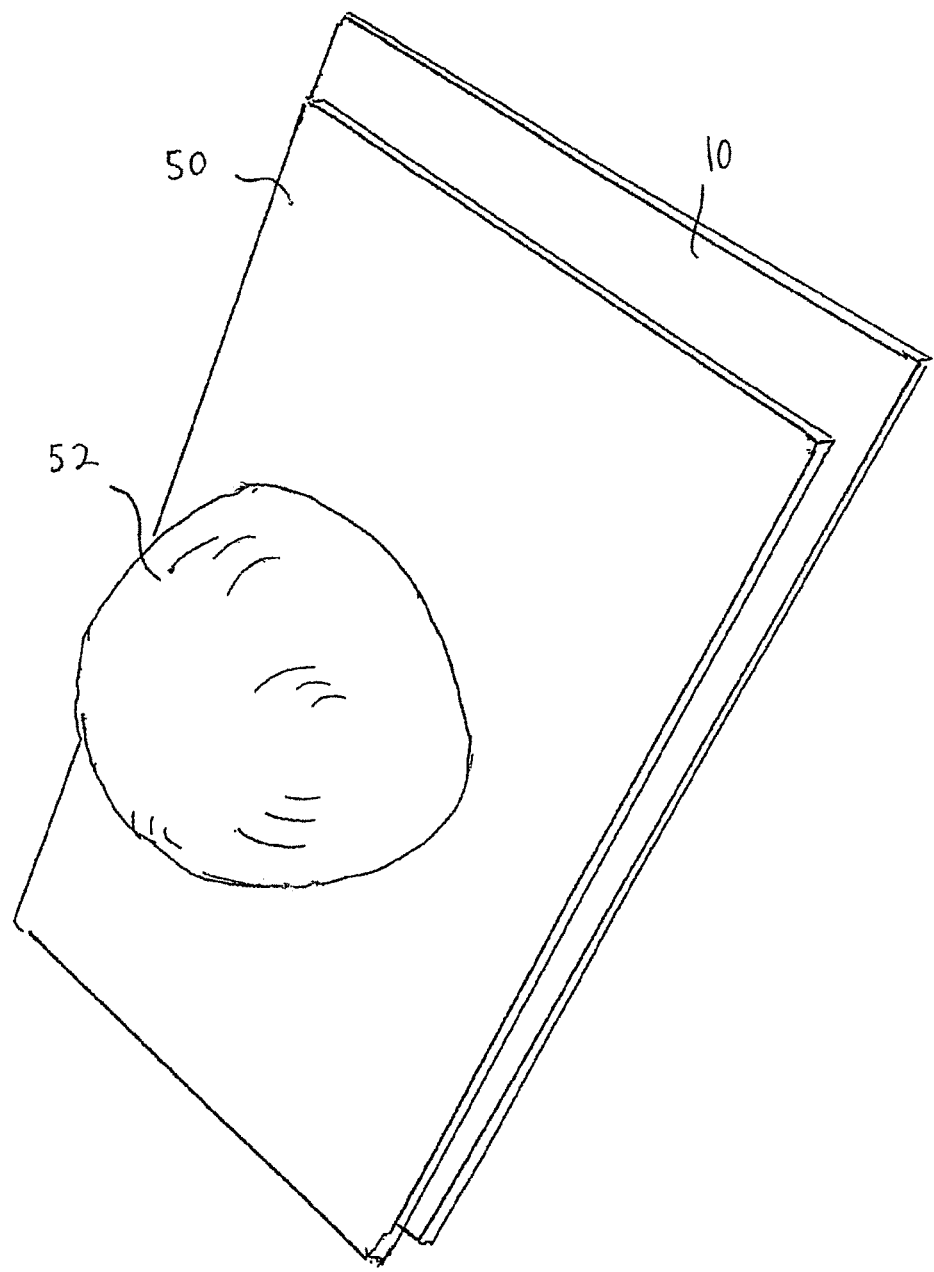
FIG. 10 is a front perspective view of a cover plate in covering relation to the one-piece steel anchor plate.

One-piece steel anchor plate 10 is adapted to be secured at a window opening. As shown in FIG. 9, a building includes a wall 22 having a portal in the form of a window 24 fitted within a support structure of the wall, in the form of double studded 2×4 framing members 26 and 28 provided around the perimeter of the window 24 for the affixation of window 24 within wall 22 in a conventional manner in the construction of buildings. Window 24 can be, for example, of a conventional double-hung construction (not shown) having a surrounding frame 30 within which an upper sash (not shown) and a lower sash (not shown) are mounted for sliding movement within frame 30, between an upper end and a lower end of frame 30. Frame 30 includes a horizontal sill 32 along the lower end, a horizontal cap 34 along the upper end, and vertical side jambs 36 extending between sill 32 and cap 34. Wall 22 includes wall board 38 along the inside of wall 22, providing a finished interior wall surface.

Preferably, one-piece steel anchor plate 10 is secured through side jambs 36 into double studded framing members 26 and 28 by mounting bolts 40. Mounting bolts 40 are provided with a length sufficiently great to extend through jamb 36 or wall board 38 and into double studded framing members 26 and 28 a distance sufficient to secure one-piece steel anchor plate 10 in place permanently. Preferably, mounting bolts 40 include four 3-inch lag bolts, two of which extend through upper elongated transverse slot 18 and two of which extend through lower elongated transverse slot 20.

This can occur at the position at an inner side of one jamb 36, as shown by one-piece steel anchor plate 10a or at a side of jamb 36 facing into the room, as shown by one-piece steel anchor plate 10b. Alternatively, a one-piece steel anchor plate 10c can be positioned immediately below bottom window sill 32 into double studded framing members 26 and 28 thereat. However, it will be appreciated that plate 10 can be located at any position around the window, and can even be positioned a slight distance away from the window. Preferably, one-piece steel anchor plate 10 is secured at a height of at least 50 inches off of the floor.

With this arrangement, outwardly bowed, arcuate securement band 16 projects into the interior of the building or window.

Figure 6:
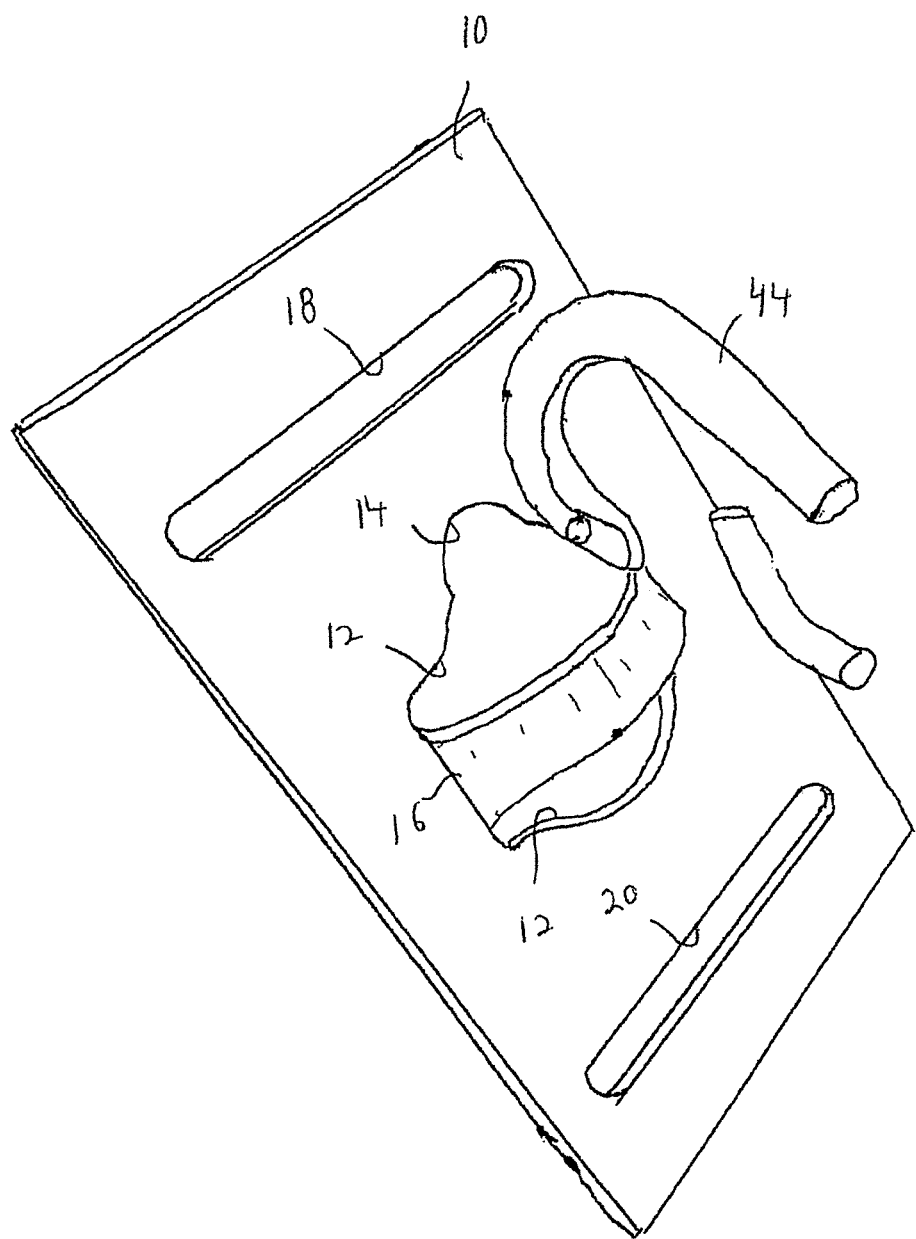
FIG. 6 is a front perspective view of the one-piece steel anchor plate and a carabiner adapted to be secured thereto.
Figure 7:
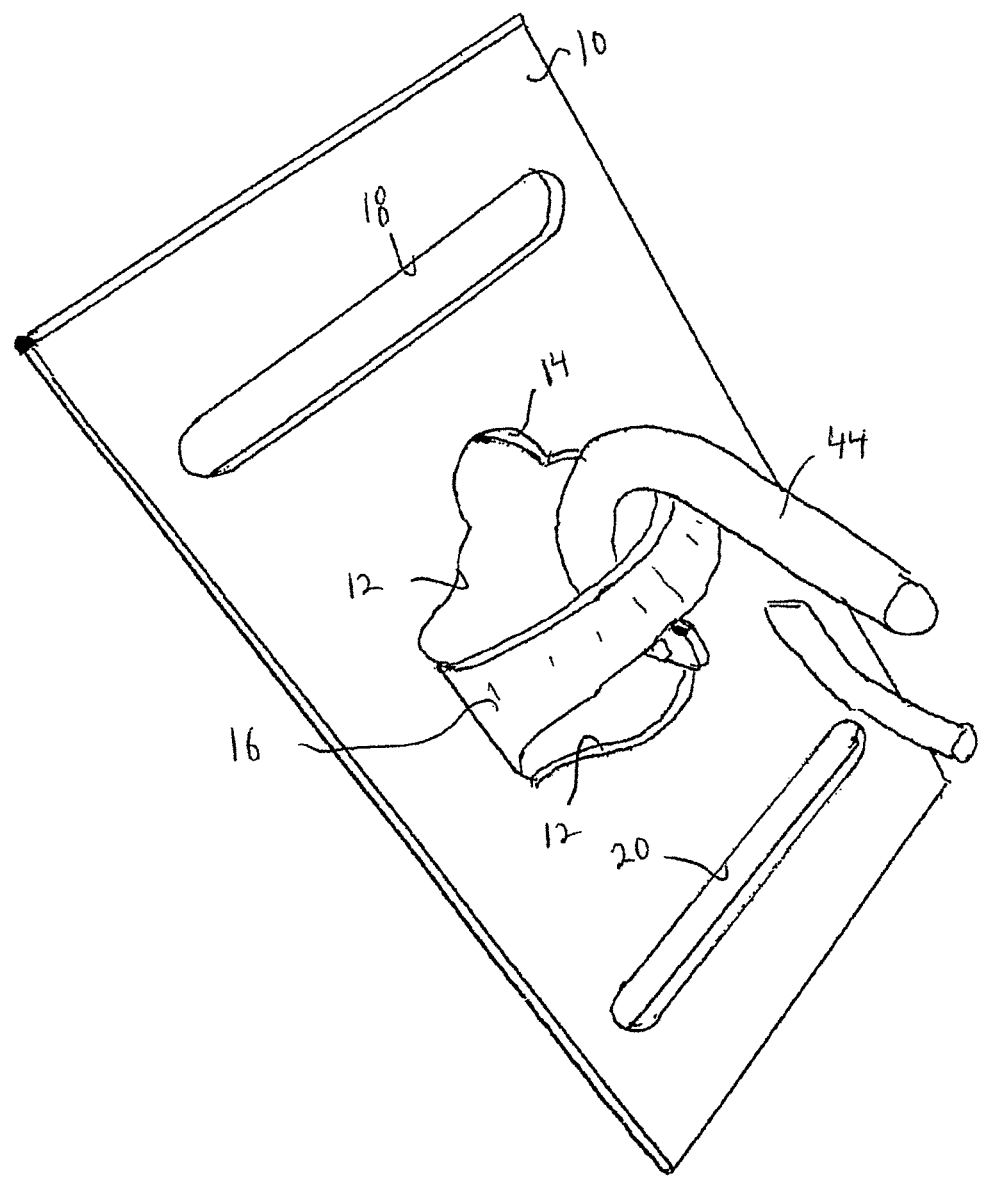
FIG. 7 is a front perspective view of the one-piece steel anchor plate with the carabiner in the process of being secured thereto.
Figure 8:
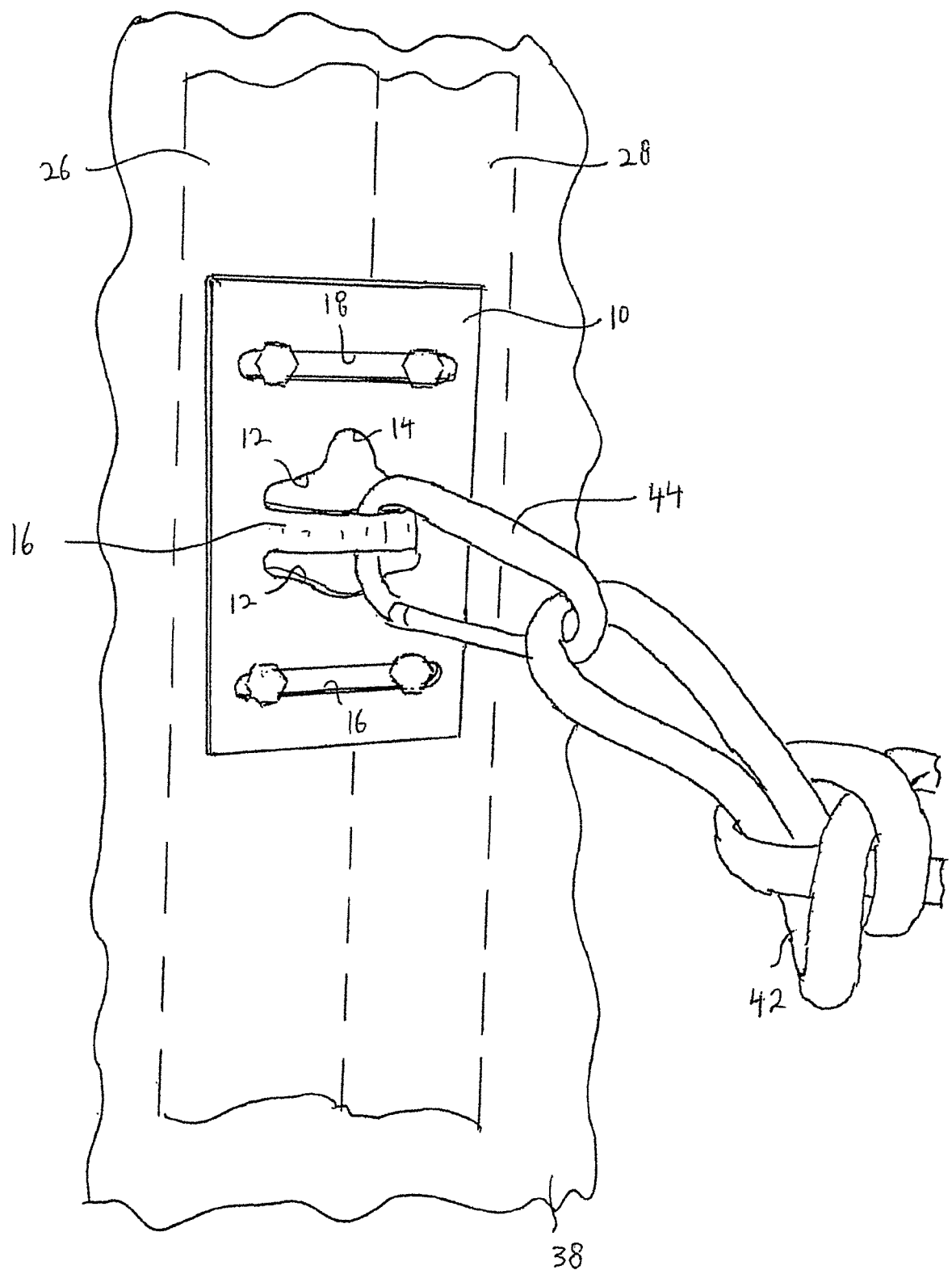
FIG. 8 is a perspective view of the one-piece steel anchor plate secured to a window frame with a carabiner secured thereto and an escape rope secured to the carabiner.

Should the need arise for a quick exit and safe escape from the building, window 24 is available as a portal for such an escape. A person, such as an occupant or a firefighter, need merely hook an escape rope 42 of, for example, 25 to 30 feet in length, to outwardly bowed, arcuate securement band 16, for example, through the use of a carabiner 44, which is standard equipment carried by firefighters, as shown in FIGS. 6-8, and then exit through the window 24 to be lowered safely to the ground, utilizing escape rope 42. Preferably, rope 42 will be knotted approximately every 12 to 24 inches to aid in the descent from the window.

Rope 42 and carabiner 44 would preferably come in a red protective bag with a grommet or the like for hanging on a door, stating clearly that it is a fire escape rope only, along with instructions printed on the bag for use thereof during a fire.

It will be appreciated that the employment of steel anchor plate 10 with the outwardly bowed, arcuate securement band 16 formed as a one-piece unitary construction, along with the four long mounting bolts 40 anchored securely into double studded framing members 26 and 28, assures that the weight of one or more escapees will be borne readily by the device, enabling a safe escape from the building through window 24.

Since double studded framing members 26 and 28 extend fully around the perimeter of window 24, the device can be located in alternate locations while still remaining closely adjacent window 24.

With one-piece steel anchor plate 10 placed at any of the aforesaid locations, the device provides a simplified permanent standby arrangement for a quick and easy method of escape from the building. One-piece steel anchor plate 10 is economically constructed and is installed in an existing building or in new construction with ease. Once installed, one-piece steel anchor plate 10 is visually unobtrusive. Further, the relatively simple construction of one-piece steel anchor plate 10 renders the device available for installation at limited expense, requiring only basic skills and tools, so as to be practical for ready placement at a multiplicity of locations throughout a building.

To provide an aesthetic appearance during non-use, a plastic cover plate 50 can be provided in covering relation to one-piece steel anchor plate 10.

As shown in FIGS. 10-14, cover plate 50 is generally of the same shape and dimensions as one-piece steel anchor plate 10. Cover plate 50 includes a pressed out semi-spherical projection wall 52 at the center thereof corresponding in position to central opening 12 in order to accommodate outwardly bowed, arcuate securement band 16 therein. A slightly arcuate hook 54 extends inwardly and downwardly from the upper end of semi-spherical projection wall 52 at the inner surface thereof. In this manner, hook 54 can be inserted through central opening 12 over outwardly bowed, arcuate securement band 16 to hold cover plate 50 in a hanging position in covering relation to one-piece steel anchor plate 10. Therefore, cover 50 can easily be removed with a touch that lifts it up and away from one-piece steel anchor plate 10, so that it does not hinder access in the case of an emergency.

Figure 11:
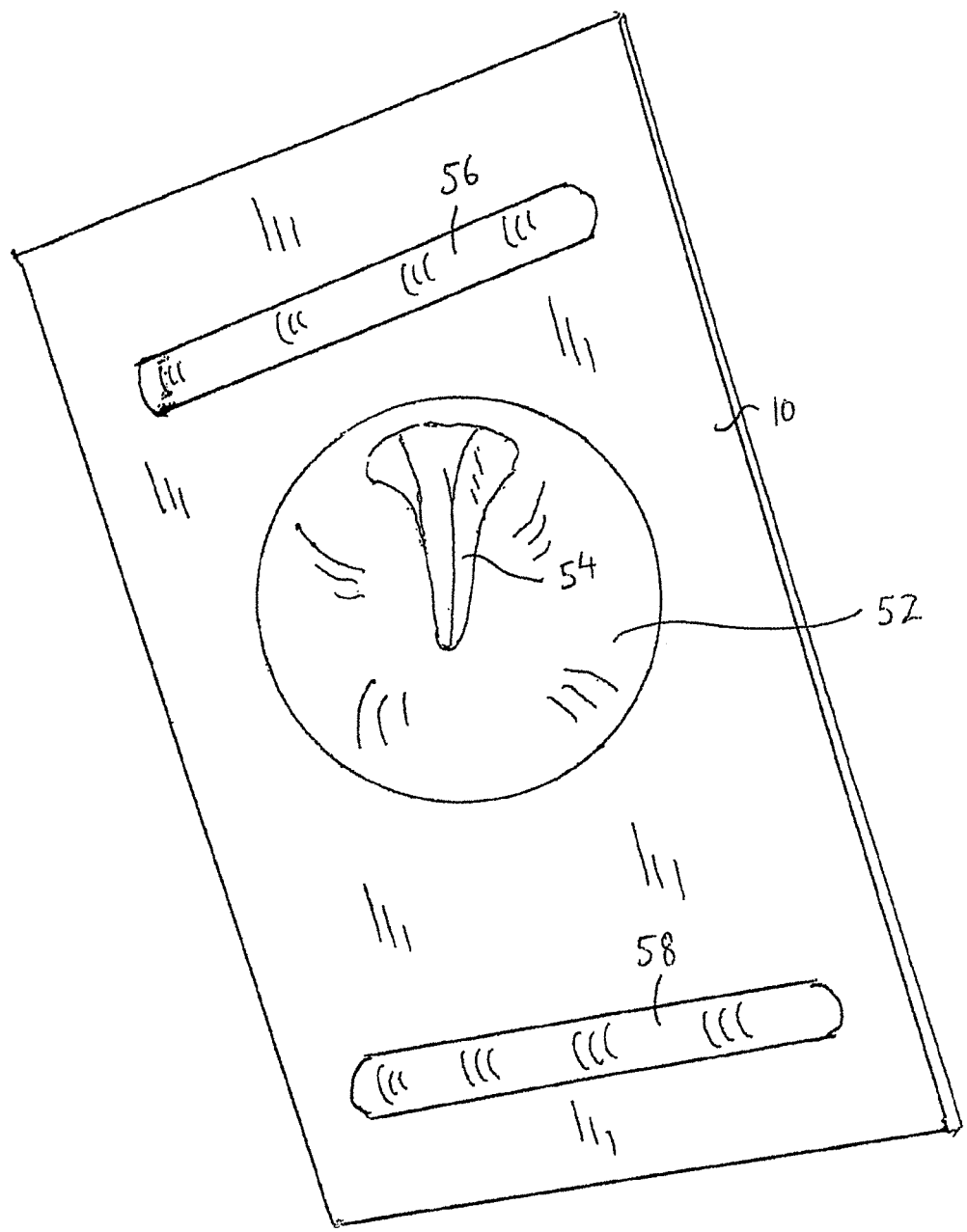
FIG. 11 is a rear perspective view of cover plate.
Figures 12, 13:
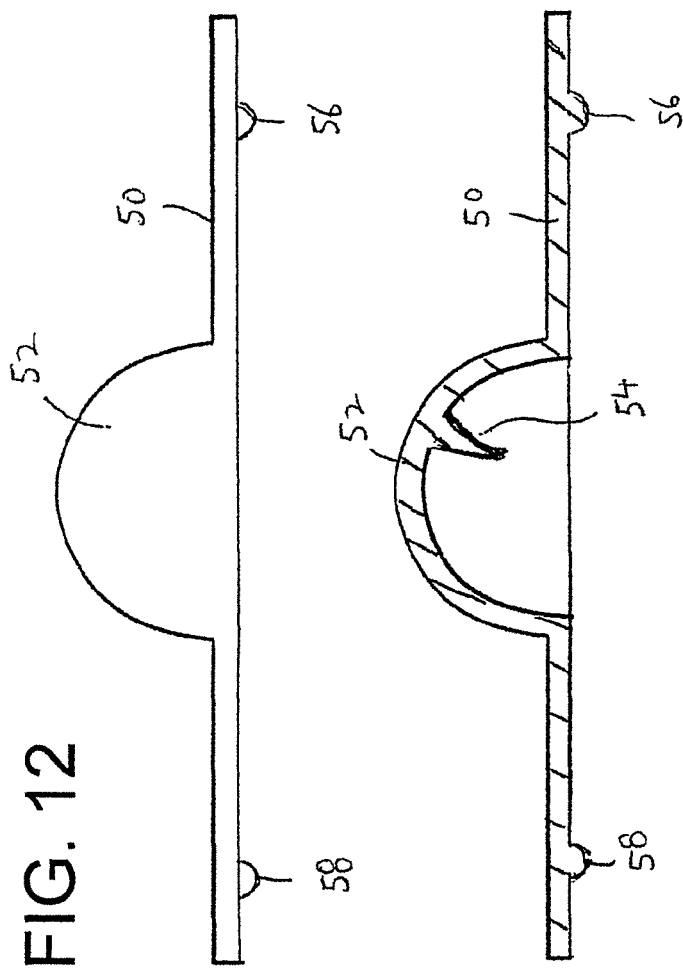
FIG. 12 is a side elevational view of the cover plate.
FIG. 13 is a cross-sectional view of the cover plate taken along line 13-13 of FIG. 11.
Figure 14:
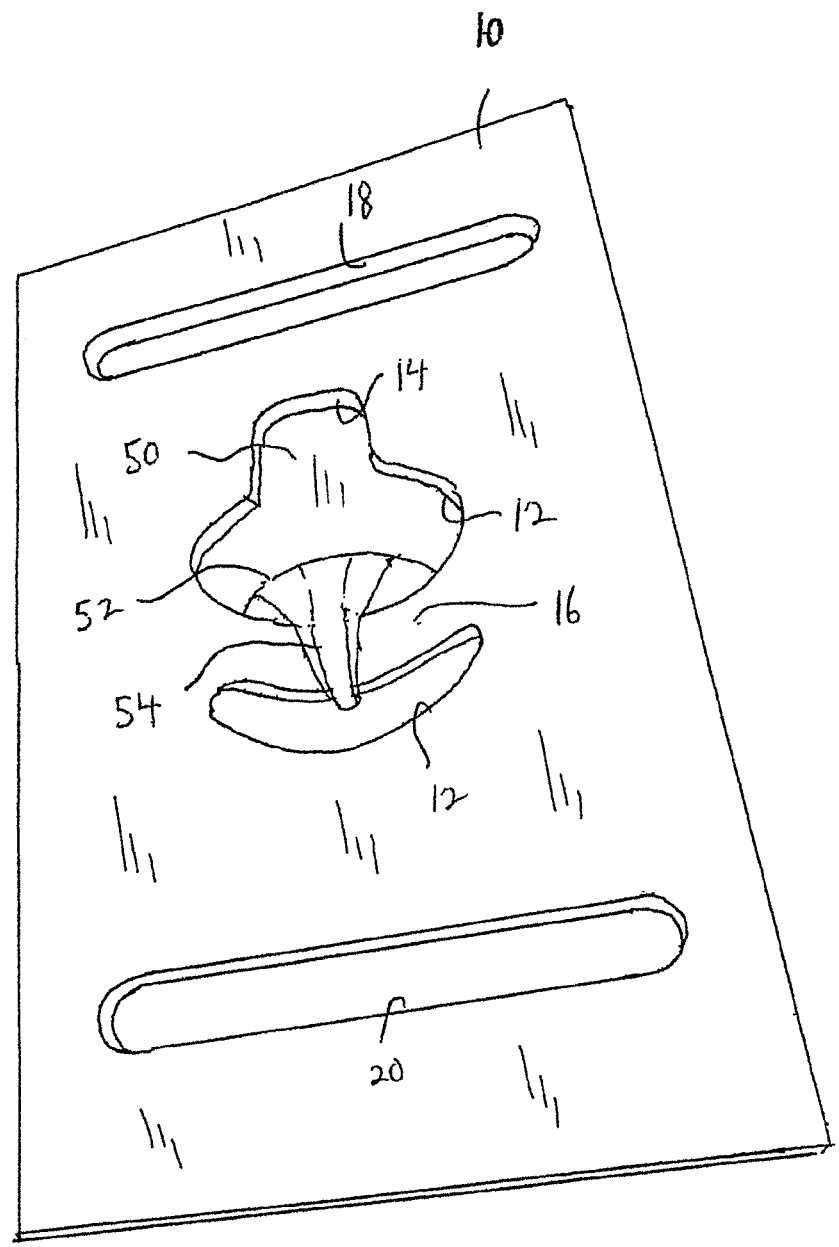
FIG. 14 is a rear perspective view of the one-piece steel anchor plate with the hook of the cover plate positioned therethrough.

In addition, cover plate 50 is formed with two transverse, elongated, outwardly curved projections 56 and 58 at upper and lower portions of the inner surface thereof, as shown in FIGS. 11-13, for engagement within upper elongated transverse slot 18 and lower elongated transverse slot 20, respectively.

It will be appreciated that various modifications can be made to the present invention within the scope of the claims.

Figure 5:
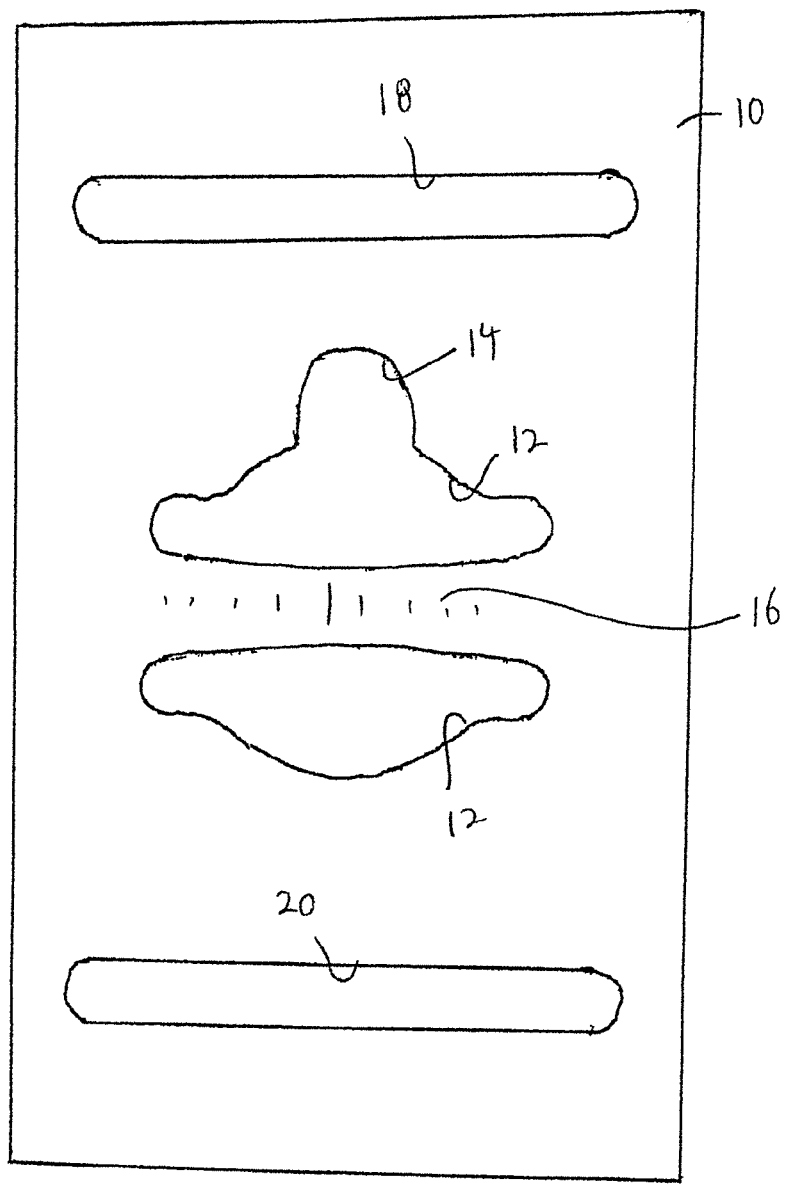
FIG. 5 is a front elevational view of the one-piece steel anchor plate.
Figure 5A:
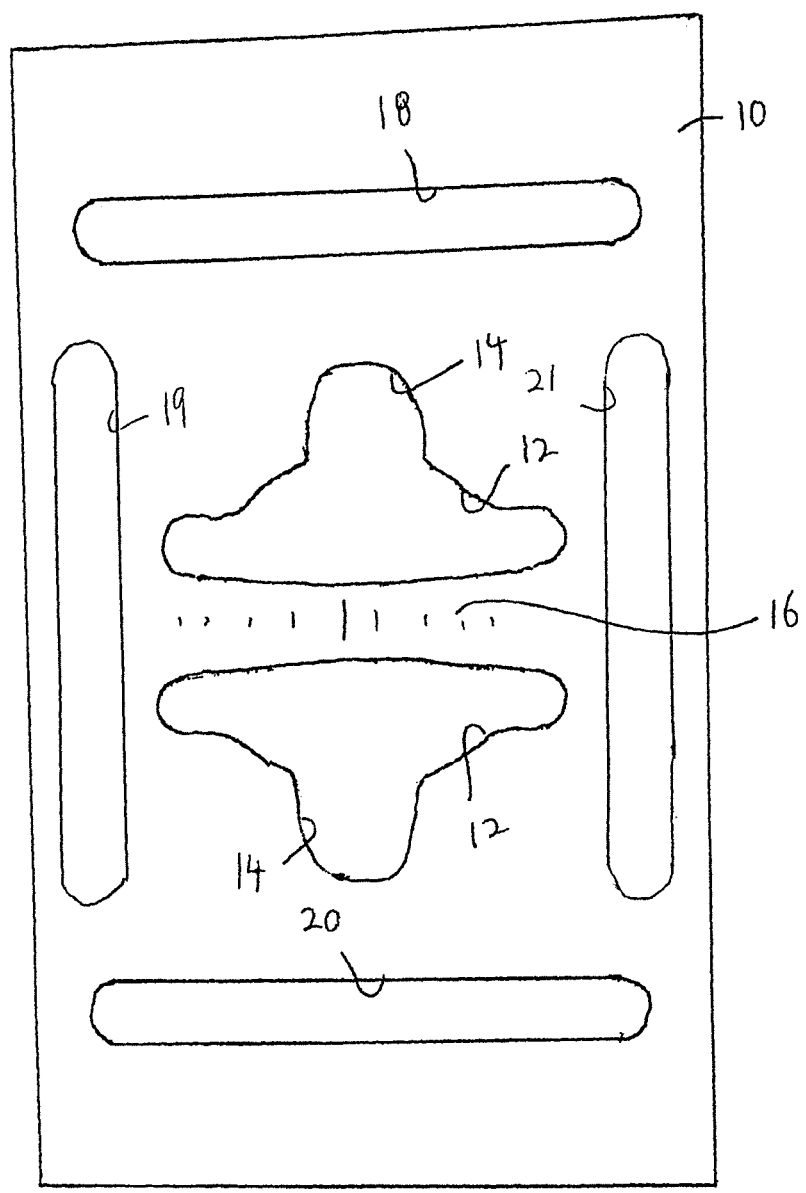
FIG. 5A is a front elevational view of the one-piece steel anchor plate according to a first modification.

For example, as shown in FIG. 5A, in addition to upper elongated transverse slot 18 and lower elongated transverse slot 20, side elongated slots 19 and 21 can be provided. These are particularly useful in places where there are no double studs, for example, in an attic. Therefore, elongated slots 19 and 21 can be provided in addition to slots 18 and 20, or alternatively in, place thereof.

Further, FIG. 5A shows a lower recess opening 14, which is a mirror image of upper recess opening 14.

Figure 5B:
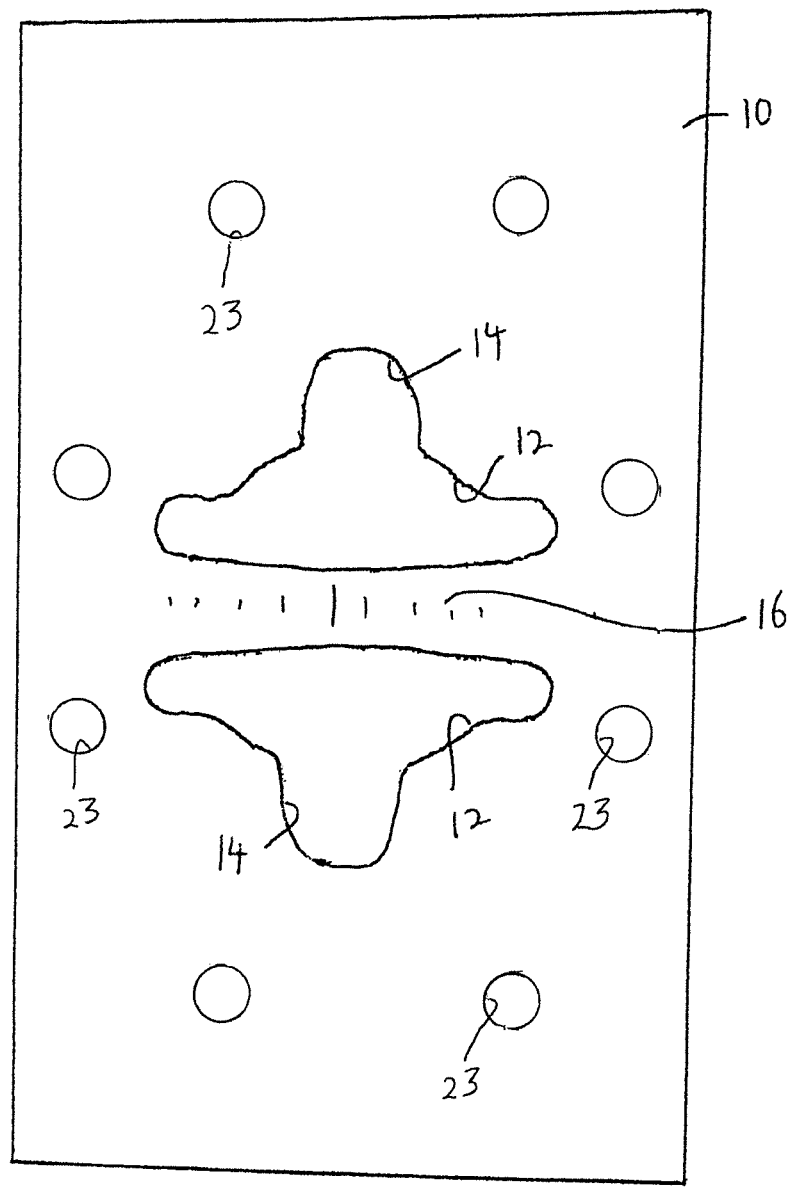
FIG. 5B is a front elevational view of the one-piece steel anchor plate according to a second modification.

In place of slots 18-21, as shown in FIG. 5B, a plurality of spaced apart openings 23 can be provided.

Having described a specific preferred embodiment of the invention with reference to the accompanying drawings, it will be appreciated that the present invention is not limited to that precise embodiment and that various changes and modifications can be effected therein by one of ordinary skill in the art without departing from the scope or spirit of the invention as defined by the appended claims.

What is claimed is:

1. A method of forming an emergency escape device to which an escape rope is adapted to be secured, the method comprising the steps of:
   forming a unitary, one-piece steel anchor plate;
   applying a press substantially centrally of the plate in order to form an outward projection having a periphery, with a remainder of the plate completely surrounding said periphery;
   a first step of cutting out portions of the outward projection to form a central opening in the plate, while leaving an outwardly extending securement band as a remnant of the outward projection to enable attachment of a carabiner, and with the remainder of the plate completely surrounding said periphery and completely surrounding said securement band on all sides thereof;
   a second step of cutting at least one first opening at one end of the plate to one side of the central opening for receiving at least one securing member for securing the device to a wall;
   a third step of cutting at least one second opening at one end of the plate to an opposite side of the central opening for receiving at least one securing member for securing the device to a wall; and
   then heat treating said plate to impart greater strength thereto.

2. A method according to claim 1, wherein:
   the plate has a rectangular shape having opposite first and second lengthwise edges and opposite shorter first and second widthwise edges,
   the securement band extends in a widthwise direction of said plate, said at least one first opening is formed adjacent said first widthwise edge, and said at least one second opening is formed adjacent said second widthwise edge.

3. A method according to claim 1, wherein the plate is at least ⅛ inch thick.

4. A method according to claim 1, wherein the central opening has a partially circular shape.

5. A method according to claim 1, wherein the outward projection has a semi-spherical shape, and the securement band has an outwardly bowed shape.

6. A method according to claim 1, wherein the first step of cutting cuts out said portions of the outward projection to form said outwardly extending securement band which increases in width at opposite ends thereof where said securement band is attached to the plate.

7. A method according to claim 1, wherein said second and third steps of cutting each cut out said at least one first opening and said at least one second opening in the form of one of:
 an elongated slot or
 a plurality of spaced part openings.

8. A method according to claim 1, further comprising the step of forming at least one removable cover plate for the one-piece steel anchor plate when not in use as an emergency escape device.

9. A method of forming an emergency escape device to which an escape rope is adapted to be secured, the method comprising the steps of:
 forming a unitary, one-piece steel anchor plate;
 applying a press substantially centrally of the plate in order to form an outward projection;
 a first step of cutting out portions of the outward projection to form a central opening in the plate, while leaving an outwardly extending securement band as a remnant of the outward projection to enable attachment of a carabiner;
 a second step of cutting at least one peripheral opening at one end of the plate to one side of the central opening for receiving at least one securing member for securing the device to a wall;
 a third step of cutting at least one peripheral opening at one end of the plate to an opposite side of the central opening for receiving at least one securing member for securing the device to a wall; and
 then heat treating said plate to impart greater strength thereto; and
 cutting out a portion of the plate to an outside of said central opening to form at least one recess opening which is in open communication with said central opening, to enable easier access of the carabiner.

10. An emergency escape device to which an escape rope is adapted to be secured, comprising:
 a unitary, one-piece steel anchor plate;
 a central opening in the plate, said central opening having a periphery;
 an outwardly extending arcuate pressed securement band extending over said central opening and connected to said plate at opposite sides of said central opening at the periphery thereof;
 a remainder of the plate completely surrounding said periphery and completely surrounding said securement band on all sides thereof;
 said central opening and said securement band formed by a semi-spherical projection pressed outwardly of the plate, substantially centrally of the plate, in order to form an outward projection, portions of the outward projection cut out to form said central opening in the plate, while leaving said outwardly extending securement band as a remnant of the outward projection to enable attachment of a carabiner;
 at least one peripheral opening cut out at one end of the plate to one side of the central opening for receiving at least one securing member for securing the device to a wall;
 at least one peripheral opening cut out at one end of the plate to an opposite side of the central opening for receiving at least one securing member for securing the device to a wall; and
 said plate being heat treated to impart greater strength thereto.

11. An emergency escape device according to claim 10, wherein the plate has a rectangular shape having opposite first and second lengthwise edges and opposite shorter first and second widthwise edges,
 the securement band extends in a widthwise direction of said plate,
 said at least one first opening is formed adjacent said first widthwise edge, and
 said at least one second opening is formed adjacent said second widthwise edge.

12. An emergency escape device according to claim 10, wherein the plate is at least ⅛ inch thick.

13. An emergency escape device according to claim 10, wherein the central opening has a partially circular shape.

14. An emergency escape device according to claim 10, wherein the securement band has an outwardly bowed shape.

15. An emergency escape device according to claim 10, wherein said outwardly extending securement band increases in width at opposite ends thereof where said securement band is attached to the plate.

16. An emergency escape device according to claim 10, wherein each said at least one peripheral opening is in the form of one of:
 an elongated slot or
 a plurality of spaced apart openings.

17. An emergency escape device according to claim 10, further comprising at least one removable cover plate for the one-piece steel anchor plate when not in use as an emergency escape device.

18. An emergency escape device to which an escape rope is adapted to be secured, comprising:
 a unitary, one-piece steel anchor plate;
 a central opening in the plate;
 an outwardly extending arcuate pressed outwardly securement band extending over said center opening and connected to said plate at opposite sides of said central opening;
 said central opening and said securement band formed by a semi-spherical projection pressed outwardly of the plate, substantially centrally of the plate, in order to form an outward projection, portions of the outward projection cut out to form said central opening in the plate, while leaving said outwardly extending securement band as a remnant of the outward projection to enable attachment of a carabiner;
 at least one peripheral opening cut out at one end of the plate to one side of the central opening for receiving at least one securing member for securing the device to a wall;

at least one peripheral opening cut out at one end of the plate to an opposite side of the central opening for receiving at least one securing member for securing the device to a wall;

said plate being heat treated to impart greater strength thereto; and at least one recess opening cut out from a portion of the plate to an outside of said central opening and being in open communication with said central opening, to enable easier access of the carabiner.

* * * * *